July 19, 1955 V. H. FRAY 2,713,175
APPARATUS FOR MAKING NUTS FROM STRIP MATERIAL
Filed May 10, 1951 3 Sheets-Sheet 1
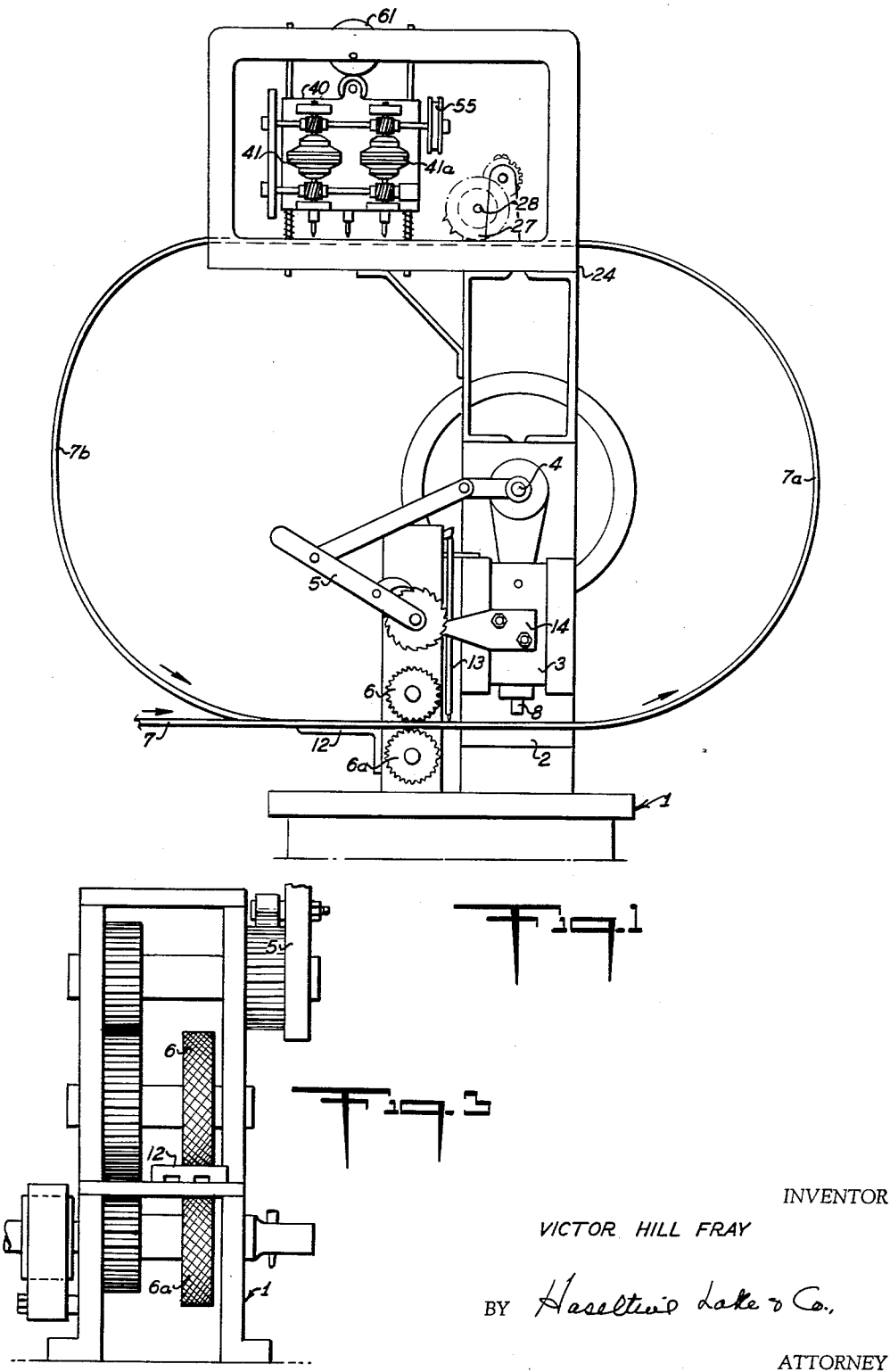
INVENTOR
VICTOR HILL FRAY
BY Haseltine Lake & Co.,
ATTORNEY

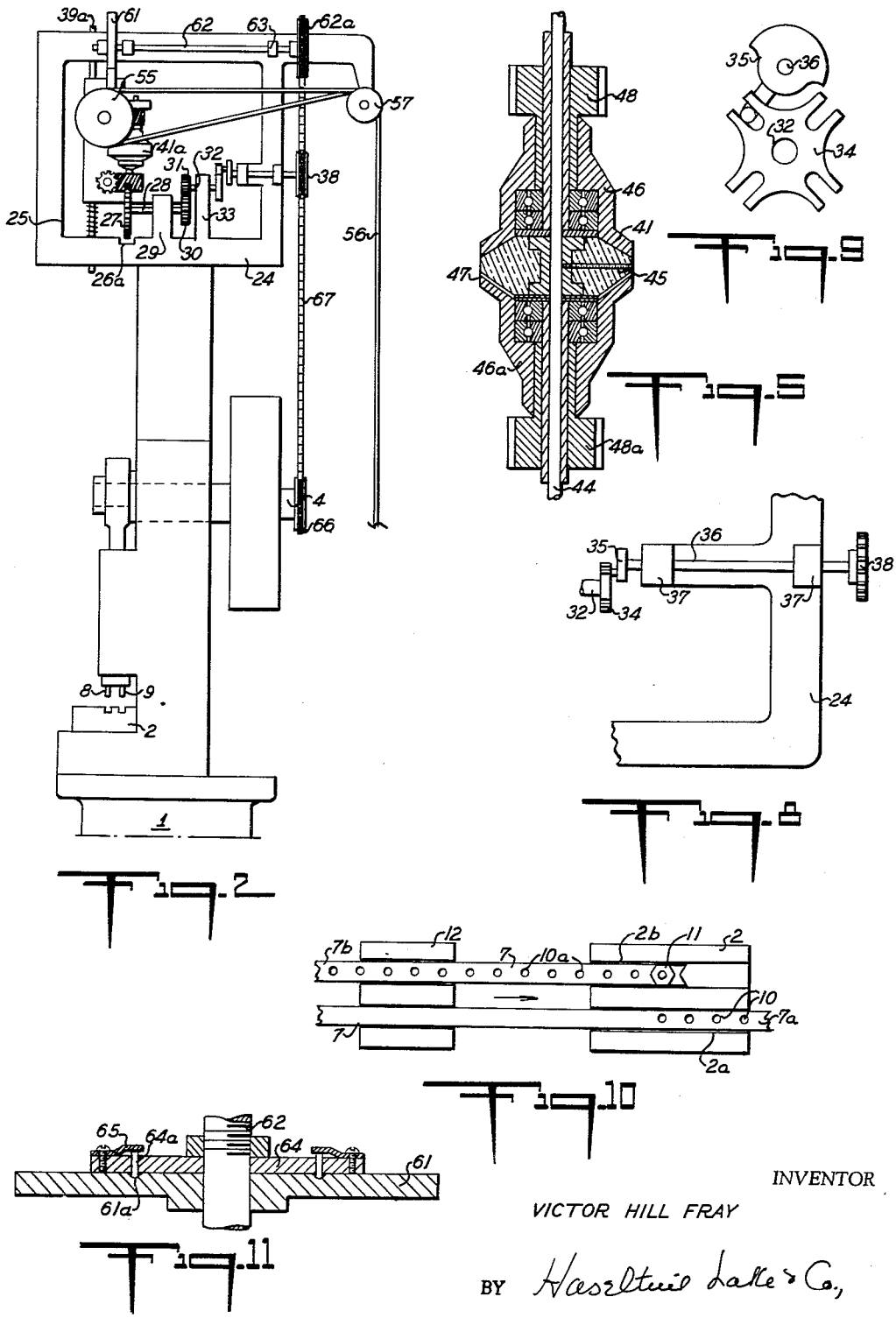

July 19, 1955  V. H. FRAY  2,713,175
APPARATUS FOR MAKING NUTS FROM STRIP MATERIAL
Filed May 10, 1951  3 Sheets-Sheet 3
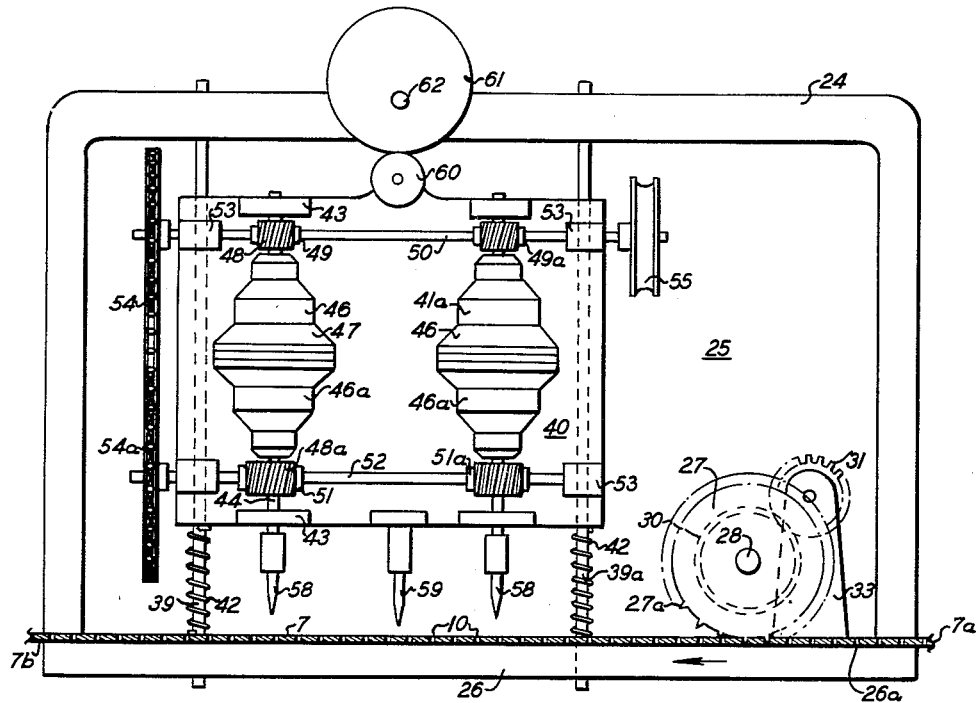
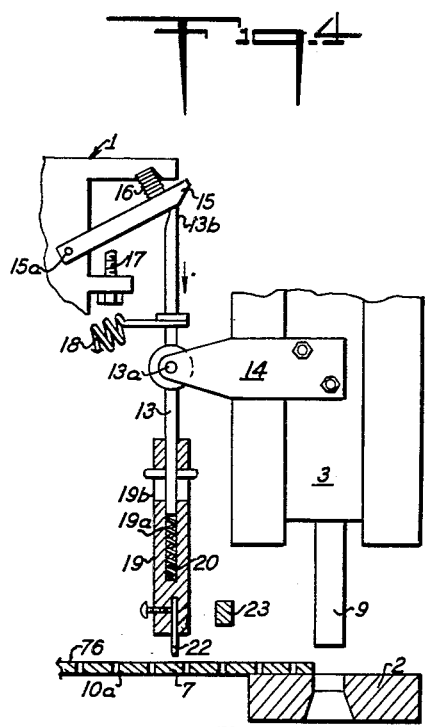
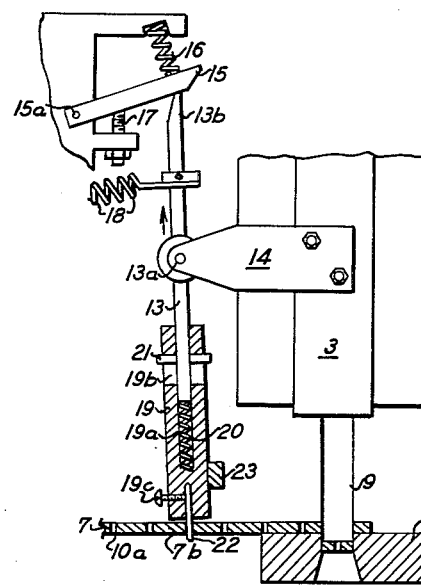
INVENTOR
VICTOR HILL FRAY
BY Haseltine Lake & Co.,
ATTORNEY

United States Patent Office 2,713,175
Patented July 19, 1955

2,713,175

APPARATUS FOR MAKING NUTS FROM STRIP MATERIAL

Victor Hill Fray, Auckland, Auckland, New Zealand

Application May 10, 1951, Serial No. 225,611

Claims priority, application New Zealand November 21, 1950

5 Claims. (Cl. 10—72)

This invention relates to the manufacture of nuts for bolts and the like and particularly to nuts of the smaller sizes, for example under 3/16", the objects of the present invention being the provision of an improved apparatus for manufacturing nuts which will speed up their production.

By present methods, the nuts are punched from metal strips with the tapping holes also punched at the same time, the nuts then passing through hopper-feed apparatus to the tapping machine, it being in this machine that the present difficulties occur when the nuts are of the smaller sizes such as those under three sixteenths of an inch Whitworth.

The difficulty is to get a smooth constant feed of these small nuts which, because of their small size with short sides or flats, are very liable to stick in the feeding chute, turn on their sides so that they get out of line and get out of true position for entry of the tap in the tapping of the thread, with the result that taps frequently get broken or the threads are tapped crooked.

My improved apparatus has been devised to avoid these obstructions and difficulties and to ensure that the tapping can be effected smoothly and substantially constantly without interruption.

In describing the invention, reference will be made to the accompanying drawings which show the preferred form of apparatus in which:

Figure 1 shows a front elevation of the apparatus,

Figure 2 is a side elevation of Fig. 1,

Figure 3 is an enlarged side elevation of the press on line G—G of Fig. 1,

Figure 4 is an enlarged front elevation of the tapping mechanism,

Figure 5 is an enlarged elevation of one of the tapping heads in section,

Figure 6 shows a partially sectioned elevation of the feeding or rocker lever and the nut punch of the press in the position at which the nut is being punched from the strip, Figure 7 is a similar view to that of Fig. 6 but with the feeding lever and nut punch in raised position preparatory to feed of the strip and punching of the nut, Figure 8 shows an enlarged partial elevation of the feed sprocket drive on line D—D of Fig. 1, Figure 9 is an enlarged end elevation of the Geneva wheel mechanism forming portion of the feed sprocket drive, Figure 10 is a plan view on line H—H of Fig. 1, and Figure 11 is a sectional elevation of the slipping clutch drive of the tapping mechanism cam.

In the invention in its preferred form as shown in the drawings, there is a punching machine or press 1 which is of a known form having a table 2, a vertically slidable crosshead 3 which carries the punches and is moved reciprocally by suitable connection to a crankshaft 4, such crankshaft 4 having a drive connection to ratchet feed mechanism 5 which imparts intermittent drive to a pair of serrated feed rollers 6 and 6a for effecting the initial feed of the metal strip 7 into the press 1, all of this mechanism being known.

This known press 1 has modifications and additions made thereto in that it is required to feed the metal strip 7 into the press 1 a second time (see Fig. 10) the crosshead 3 carrying two punches 8 and 9 which are disposed one behind the other (see Fig. 2) with the front punch 8 punching the tapping holes 10 in the strip 7 and the rear punch 9 punching the nuts 11 which may be hexagon in shape as shown or of square shape from the strip 7 (see Fig. 10) the table 2 having two lateral and parallel slots 2a and 2b cut therein and there being also a slotted guide 12 secured to the press 1 so that the two portions of the strip 7 will travel parallel to each other through the press under the punches 8 and 9.

While the serrated feed rollers 6 and 6a are satisfactory for the initial feed of the strip 7 into the press 1, such type of feed would not be satisfactory for the second feed of the strip after the holes have been tapped therein, it being required to have absolutely correct register of the tapped holes 10a with the punch 9 when the latter punches the nuts 11 from the strip 7 so that the tapped holes are central in the nuts 11.

Accordingly, a further feed is applied to the press 1 (see Figs. 6 and 7) this comprising a feed or rocking lever 13 which has a pivot 13a near the centre of its length by which it is pivotally mounted on the outer end of an arm plate 14 which is secured to the press crosshead 3 so as to move reciprocally along with the latter, the top end 13b of the lever 13 engaging under a bar 15 which is secured by a pivot 15a to the press 1, there being a compression spring 16 bearing against an upper corner of the bar 15 to yieldingly force the bar 15 downward against an adjustment screw 17 which is also mounted to a suitable part of the press 1, a tension spring 18 being secured between the rocker lever 13 and the press and tending to draw the upper end of the lever 13 away from the crosshead 3 while the lower end of the lever is moved towards such crosshead 3.

On such lower end of the rocker lever 13 below the pivot 13a there is an engaging head 19, this being as of cylindrical form with the lower end of the rocker lever 13 slidably fitted into a bore 19a extending down from the top end thereof, a compression spring 20 being located in the bottom of the bore 19a to bear against the bottom end of the rocker lever 13, there being also a slotted hole 19b through the head 19, a pin 21 secured to the rocker lever 13 passing through this and being slidable within said slotted hole 19b.

Extending downward from the bottom of the head 19 there is the strip engaging pin 22, this being adjustably held as by a setscrew 19c, a stop bar 23 being secured to the press 1 against which the head 19 will bear as shown in Fig. 6 at the limit of feeding travel of the head 19 and pin 22 towards the crosshead 3 in what is the equivalent of a walking stick movement.

Mounted on top of the press 1 there is a suitable frame 24 for carrying the tapping mechanism 25 (see Fig. 4) this having a guide or platform 26 with a slot 26a therein along which the strip 7 with the tapping holes 10 punched therein is adapted to travel, such travel being effected by a feeding sprocket 27 the teeth or points 27a of which are at correct pitch to register with the spacing of the holes 10 in the strip 7.

This sprocket 27 is mounted on the front end of a shaft 28 which is rotatable in a bearing 29 which extends up from the frame 24 (see Fig. 2) and on the rear end of the shaft 28 there is a gear wheel 30 which is in mesh with a pinion 31 on a countershaft 32 which is rotatable in a bearing 33 extending up from the frame 24, the rear end of this countershaft 32 having a Geneva wheel 34 secured thereto (see Figs. 8 and 9) the known crank and web mechanism 35 associated with the Geneva wheel 34 being mounted on a drive shaft 36 which is supported in bearings 37 extending from the frame 24, a chain sprocket 38 being mounted on the back end of this drive shaft 36.

To the frame 24 two vertical spaced apart guide rods 39 and 39a are rigidly secured (see Fig. 4) these being adapted to slidably carry the vertical baseplate or crosshead 40 which carries the tapping heads 41 and 41a which are preferably two in number, but which could be three or more in number, if so desired, the crosshead 40 having lugs at the rear thereof (not shown) by which it is vertically slidable on the guide rods 39 and 39a, with compression springs 42 on the lower ends of the rods 39 and 39a bearing against the bottom lugs so as to yieldably force the crosshead 40 upward.

The tapping heads 41 and 41a are each carried by pairs of vertical bearings 43 extending from the crosshead 40, in which their tapping spindles 44 are rotatable, each spindle 44 (see Fig. 5) having a central double faced cone 45 secured therein against which the friction faces of upper and lower clutches 46 and 46a are adapted to bear alternately, these clutches 46 and 46a being freely rotatable on the spindle 44 and there being slack or a gap 47 so that only one clutch at a time can bear on the cone 45, these clutches 46 and 46a having skew gears 48 and 48a secured thereto, the upper skew gears 48 of the two tapping heads 41 and 41a meshing with driving skew gears 49 and 49a (see Fig. 4) which are secured to an upper horizontal drive shaft 50, with similar skew gears 51a on a lower horizontal shaft 52 meshing with the lower skew gears 48a of the lower clutches 46a, these shafts 50 and 52 being rotatable in bearings 53 extending from the crosshead 40, gear wheels 54 and 54a being mounted on the ends of the shafts 50 and 52 and being in mesh so that the latter rotate in opposite directions, and thus impart opposite rotation to the upper and lower clutches 46 and 46a, the upper shaft 50 having a driving pulley 55 secured theretofor receiving drive by a belt 56 (see Fig. 2) passing over jockey pulleys 57 which are rotatably mounted on the frame 24, the belt 56 also passing to the electric motor or the like which drives the press.

The bottom ends of the spindles 44 of the tapping heads 41 and 41a have the taps 58 removably and concentrically secured thereto extending down directly above the path of the strip 7 and in line with the taps 58 there is a vertical registering pin 59, this being secured to the baseplate 40 to project down a little lower than the points of the taps 58 and being of size capable of free entry to the tapping holes 10 in the strip 7.

The upper edge of the baseplate or crosshead 40 carries a roller 60 and against this a cam 61 bears, this cam 61 which is of the known constant feed type, being freely rotatable on a cam shaft 62 which is carried in bearings 63 extending from the frame 24 (see Fig. 2) the cam 61 receiving drive through a slipping clutch mechanism (see Fig. 11) which comprises a driving disc 64 secured to the shaft 62, pins 64a which are slidable through the disc 64 towards the cam 61 with shallow depressions 61a in the latter into which the pins 64a are yieldingly forced by strip springs 65, there being preferably two opposite sets of thee pins 64a and springs 65, but with the pins at different radial distances from the shaft 62 so that a complete revolution of the disc 64 is required from release to reengagement with the cam 61.

At the rear end of the cam shaft 62 there is mounted a chain sprocket 62a and secured to the rear and of the crankshaft 4 there is also a sprocket 66 (see Fig. 2) a chain 67 effecting a positive drive passing between these said sprockets 62a and 66 with one portion of the chain 67 also passing over the sprocket 38 of the feed drive shaft 36, these sprockets 62a, 66 and 38 being of such sizes as will give desired synchronisation of the operations of the press 1 and the tapping mechanism 25 and their respective feeds to enable two looped portions 7a and 7b of the strip 7 between the press 1 and the tapping mechanism 25 and the latter back to the press 1 to remain substantially constant.

A similar form of slipping clutch mechanism as applied to the cam 61 may also be applied between the feeding sprocket 27 and the shaft 28 to which it is mounted.

In use or operation, the speed of operation of the press 1 is such that its crosshead 3 does two downward strokes to one of the tapping mechanism crosshead 40 in downward direction, the latter by being provided with the two tapping heads 41 and 41a tapping two tapping holes 10 at a time in the strip 7 at each downward stroke of the crosshead 40, while each downward stroke of the press 1 crosshead 3 causes the punch 8 to punch one tapping hole 10 in the strip 7.

Incidentally, during the same downward stroke of the press crosshead 3, the punch 9 punches out a nut 11 from the end of the strip 7.

The strip 7 leaves a roll of such strip material and is fed through the press intermittently and in uniform amounts by the feed rollers 6 and 6a so that the punch 8 punches the tapping holes 10 in the strip 7 at even intervals apart, the strip 7 with such tapping holes 10 therein passing upward and in loop form 7a to the tapping mechanism 25 to pass into the slot 26a of the guide or platform 26 of such tapping mechanism 25, whereby the teeth or points 27a of the feeding sprocket 27 engage in the tapping holes 10 of the strip 7.

The drive between the chain sprocket 38 and such feed sprocket 27 via the Geneva wheel 34 is such that the feed sprocket 27 rotates intermittently a distance equal to two teeth at a time, this feed taking place while the crosshead 40 is in the upward position and with the strip 7 passing under the crosshead 40, the rotation of the cam 61 causing the latter to move downward against the resistance to such movement as imposed by the compression springs 42.

Provided the registering pin 59 can freely enter one of the tapping holes 10 in the strip 7, the crosshead 40 will continue to descend so that the pointed ends of the taps 58 enter tapping holes 10 in the strip 7, this causing upward pressure or thrust to be applied to the spindles 44 of the tapping heads 41 and 41a so that the cones 45 of such heads press upward against the upper clutches 46 the rotation of which is imparted through the cones 45 to the spindles 44 to so rotate them that their respective taps 58 screw down into the tapping holes 10 and cut the threads therein.

The travel of the crosshead 40 and the taps 58 is only a small distance and momentary, the rotation of the cam 61 merely imparting a downward stroke to the crosshead 40 and then returning so that the latter is free to move upward as caused by the compression springs 42 and therefore immediately the cam 61 permits upward return travel of the crosshead 40, downward pull is transmitted to the spindles 44, thus, because of the slack or gap 47, the cones 45 move downward whereby they engage the lower clutches 46a and as the latter are rotating in opposite direction to the upper clutches 46, the rotation of the spindles 44 and their taps 58 is reversed, so that the taps screw out of the tapped holes 10a.

In the event of the registering pin 59 failing to enter one of the tapping holes 10 by not correctly registering with same, this will cause resistance to be imposed on the downward travel of the crosshead 40, the resistance being such as to cause the slipping clutch mechanism (see Fig. 11) to come into operation.

The cam 61 would stop rotating because of the pins 64a moving outward from engagement in the depressions 61a of the cam 61, the latter because of becoming free being pushed back because of the compression springs 42 continually tending to force the crosshead 40 upwardly, the cam shaft 62 making substantially one revolution before the pins 64a will re-engage the depressions 61a so that the cam 61 again takes up rotation along with its shaft 62.

In the meantime, the strip 7 will have been fed through a distance equal to two holes and provided the registering pin 59 correctly enters a tapping hole 10, the machine will continue its normal operation, the check which has taken place in the operation having avoided possible breakage of the small and delicate taps 58.

With the two tapping heads 41 and 41a on the crosshead 40 as shown, one of these will be tapping the holes of odd numbers while the other is tapping the holes of even numbers, but obviously, if there are more of these tapping heads on the crosshead 40, the feeding sprocket 27 would be arranged to feed the strip a greater number of holes with suitable alteration of the strokes of the tapping apparatus crosshead 40 in relation to those of the press crosshead 3 so that there is a substantially constant and uniform speed of feed into the press and into the tapping mechanism 25.

The strip 7 on leaving the tapping mechanism 25 has tapped holes 10a therein and passes as the looped portion 7b down to the press 1 and along the slotted guide 12 and the slots 2b of the table 2, being fed to the punch 9 by the rocker lever 13.

With the crosshead 3 of the press 1 in the raised position as shown in Fig. 7, the rocker lever 13 and its attached parts is also in the raised position so that its strip engaging pin 22 is clear of the strip 7.

On downward travel of the crosshead 3 the arm plate 14 moves the rocker lever 13 downwardly whereby the strip engaging pin 22 enters a tapped hole 10a of the strip 7 and as the rocker arm 13 descends, its top end 13b slides against the under surface of the bar 15, with the tension spring 18 drawing the said top end of the rocker lever 13 away from the crosshead 3.

This causes opposite direction of travel of the lower end of the rocker arm 3 until the engaging head 19 portion thereof comes to bear against the stop bar 23, the effect being that the strip 7 has been smartly moved along the table 2 a distance equal to that between tapped holes 10a and just prior to contact of the punch 9 with top of the strip 7, the descent of the punch causing the punching of the nut 11 from the strip 7.

During the descent of the punch 9 the rocker arm 13 makes similar movement, but as the engaging head 19 has or may have travelled to the limit permitted, the bottom end of the rocker lever 13 slides into the bore 19a of the engaging head 19 and compresses the spring 20 still further, this arrangement ensuring that there will be a required flexibility of movement in the engagement of the pin 22 with the strip 7 and ensure that injurious pressures will not be applied to the strip 7.

Accordingly, it will be seen that the strip 7 is firstly fed into the press 1 to have tapping holes punched therein at suitable intervals apart and is thereafter fed in a manner somewhat similar to that of a cinematograph film at intermittent intervals into the tapping machine wherein the tapping holes are tapped or threaded, the strip as discharged from the tapping machine being then intermittently fed into the press a second time, whereby the nuts are punched from the strip.

As previously mentioned, the lengths of the loops 7a and 7b of the strip 7 remain substantially constant, this being essential because of the different feed times and feed rates of the tapping mechanism 25 and the press 1, an advantage of the passage of the strip 7 twice through the press 1 being in that breakage of the punches 8 and 9 is minimised as against the known presses which have two punches on the crosshead effecting follow-on punching at short distances apart on the strip 7, the pressure of these closely located punches causing expansion of the strip just prior to the actual piercing being effected and this on the short piece of strip between the punches tending to force the punches outwardly, whereby they are subjected to sideways strain which can cause them to break.

The punch 9 may be provided with a central locating pin (not shown) which will enter the tapped holes 10a in the strip 7 just prior to the main surface of the punch punching the nuts 11 from the strip 7, such locating pin more accurately locating the hole in the nut.

With the taps 58 having sharp points, they will obviously more readily guide themselves into the tapping holes 10 when the tapping heads 41 and 41a descend, and in addition, if the point of a tap 58 hits the strip 7 during a miss-feed of the latter, the tap 58 will merely rotate on its point and not break as usually otherwise happens if the tap is flat on its end.

As modification of the apparatus described, it will be obvious that instead of the one press 1 performing the two operations of firstly punching the tapping holes 10 in the strip 7 and then subsequently punching the nuts 11 from the end of the strip 7 after the holes have been tapped, there could be two presses, one performing the punching of the tapping holes 10 only and the other press punching the nuts 11.

I claim:

1. Apparatus for forming nuts for bolts out of strip material, comprising a first station having means to punch single holes in said strip material at uniform intervals apart, a second station having means to tap said punched holes, said second station being spaced from said first station with a slack in the strip material therebetween, and a third station having means to punch nuts from said strip material, said third station being spaced from said second station with a slack in the strip material therebetween, said first and third stations being adjacent one another and operated simultaneously, said second station being in a plane spaced from said first and third stations and operating relatedly therewith, the slack between said stations being in the form of two 180° degree loops whereby a 360° loop is formed in said strip material when extending through said stations, the means at said second station operating at a fraction of the speed of said first and third stations and being adapted to tap a plurality of holes simultaneously, whereby the effective speed of said strip material through said apparatus is equal to the punching speed of said first and third stations due to the tapping process at said second station being performed on more than one hole at a time, the slack between said stations increasing and diminishing cyclicly in order to allow said operations of different duration.

2. Apparatus according to claim 1 wherein guide means are provided so as to maintain the proper relationship of the holes punched in said strip at said first station when passing through succeeding stations.

3. Apparatus for manufacturing nuts for bolts or the like as claimed in claim 1 wherein the tapping means comprise a frame mounted on the press, a guide platform on said frame with a slot therein along which the strip travels, guide rods secured to the frame on which a vertical crosshead is vertically slidable, spring means for yieldingly holding the crosshead in upward position, a roller on the crosshead engaged by a cam, a drive to said cam to cause it to effect movements of the crosshead which are synchronized with movements of the press, tapping heads rotatably mounted on the crosshead with reversible drive means for their spindles, pointed taps secured to the bottom ends of the tapping head spindles and a vertical registering pin secured to the crosshead.

4. Apparatus for manufacturing nuts for bolts or the like as claimed in claim 1 wherein feed means is provided for engaging the tapping holes in the strip material to feed the latter through the tapping means, said feed means comprising a feeding sprocket having teeth, the points of which are at correct pitch to register with the spacing of the tapping holes in the strip material, said feeding sprocket being disposed over a slot in the tapping means, along which the strip travels, said feeding sprocket being mounted on a shaft which is rotatable in a bearing extending from the said tapping means, the shaft being connected through gearing to a countershaft on which is secured a Geneva wheel, crank and web mechanism associated with the Geneva wheel being mounted on a drive shaft which receives a drive from the punch means whereby the movements of the feeding sprocket are synchronized with movements of the punch means.

5. Apparatus for manufacturing nuts for bolts or the like as claimed in claim 1 wherein feed means is provided to the punch means for engaging the tapped holes in the strip material to feed the latter into the punch means to have the nuts punched therefrom, said feed means comprising an arm plate secured to said punch means, a rocking lever pivoted to the outer end of said arm plate, a bar pivoted to the punch means adapted to be engaged by the top end of the rocking lever, spring means for pressing the bar down on the said top end of the rocking lever, a tension spring secured between the upper portion of the rocking lever and the punch means, an engaging head slidably fitted on the bottom of the rocking lever, a spring within the engaging head bearing against the bottom of the rocking lever, a pin secured to the rocking lever and passing through a slotted hole through the engaging head, an engaging pin projecting from the bottom of the engaging head adapted for engaging in the tapped holes in the strip material, and a stop bar secured to the punch means against which the engaging head is engaged to come to bear.

References Cited in the file of this patent

UNITED STATES PATENTS

| | | |
|---|---|---|
| 788,851 | Schneider | May 2, 1905 |
| 1,912,971 | Claeson | June 6, 1933 |
| 2,070,032 | Swanstrom | Feb. 9, 1937 |
| 2,073,467 | Dembowski et al. | Mar. 9, 1937 |
| 2,083,023 | Johnson et al. | June 8, 1937 |
| 2,238,921 | Waldsmith | Apr. 22, 1941 |
| 2,265,052 | Anderson | Dec. 2, 1941 |
| 2,369,551 | Feiler | Dec. 2, 1941 |
| 2,371,440 | Hall | Mar. 13, 1945 |
| 2,521,435 | Wockenfuss | Sept. 5, 1950 |